June 4, 1946.  P. E. MERCIER  2,401,365
POWER TRANSMISSION MECHANISM FOR AIRCRAFT ENGINES
Filed Aug. 10, 1943  2 Sheets-Sheet 2

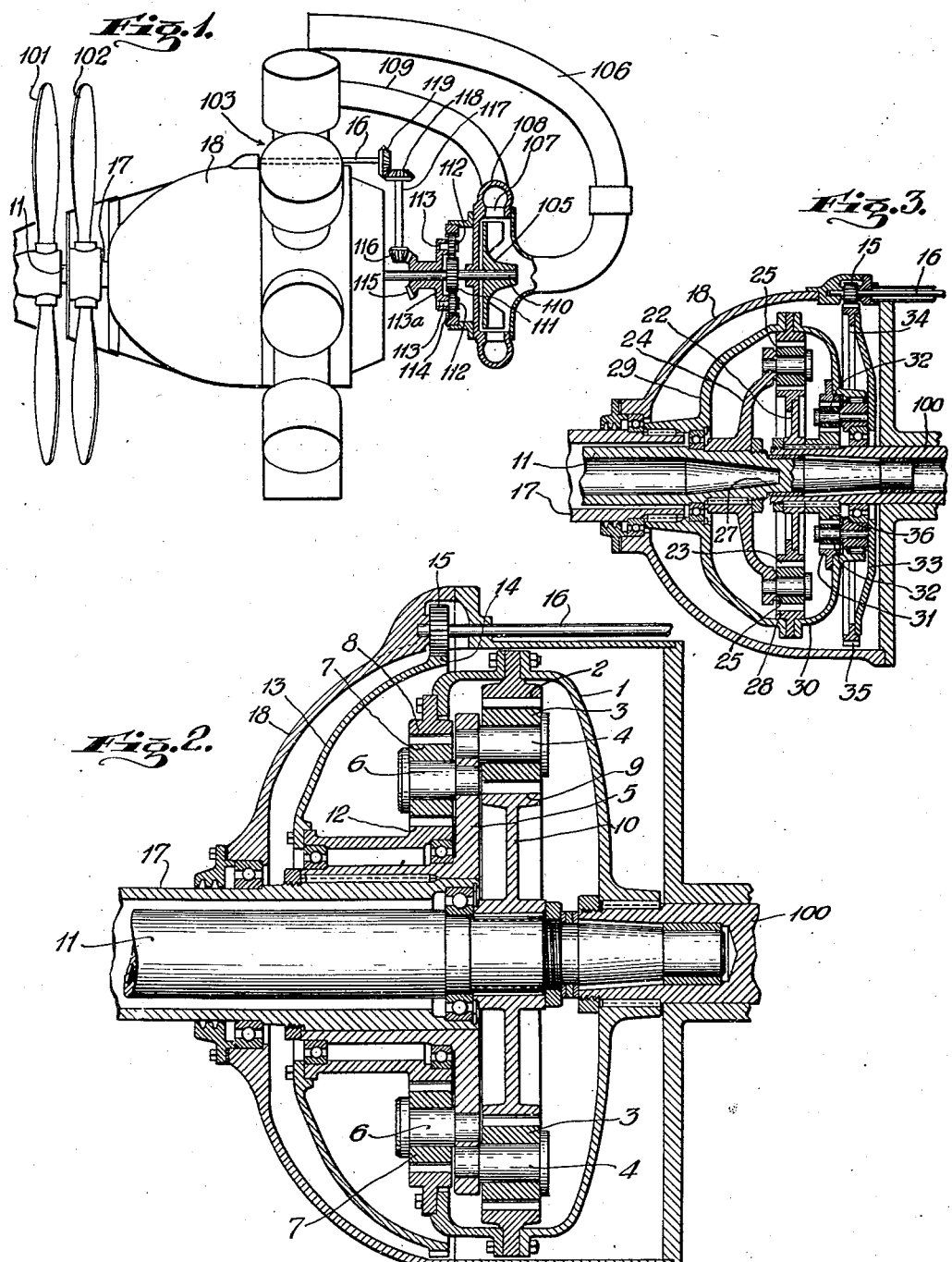

INVENTOR
PIERRE ERNEST MERCIER
BY Bartlett, Eyre, Keel & Weymouth
ATTORNEYS

Patented June 4, 1946

2,401,365

UNITED STATES PATENT OFFICE 2,401,365

POWER TRANSMISSION MECHANISM FOR AIRCRAFT ENGINES

Pierre Ernest Mercier, New York, N. Y., assignor to Stratos Corporation, Farmingdale, N. Y., a corporation of Delaware Application August 10, 1943, Serial No. 498,034

10 Claims. (Cl. 123—171)

My present invention relates to power transmission mechanisms for aircraft engines and comprises improved mechanical means for driving aircraft accessories such as the supercharger, the blower for delivering cooling air to the engine and the like. More particularly the invention comprises means for obtaining any desired relation between the speed of the engine shaft and the rotating speed of accessories driven thereby and for continuously changing such relation within reasonable limits in accordance with the altitude of flight and the power developed by the engine.

Known transmission mechanisms for driving counterrotating propellers from the engine shaft may be divided roughly into two types. In one type of mechanism the rotating speed of each propeller necessarily bears a fixed ratio to the engine speed. In the other type of known mechanism, and that with which the present invention is concerned, there is no such fixed ratio between the rotating speed of either propeller and that of the engine. Such latter type of mechanism may include two gear assemblies having a common part moving freely to apportion the respective torques applied to the propeller shafts; when such gear assemblies are symmetrical the respective torques applied to the propeller shafts are equal. When such gear assemblies are unsymmetrical the ratio of the respective torques applied to the propeller shafts is not equal to one but is invariable for any given mechanism.

In accordance with the present invention an auxiliary shaft of an airplane accessory is so connected to mechnism of the above mentioned second type that the rotating speed of the auxiliary shaft is a predetermined function of the rotating speeds of the propellers.

This arrangement permits of a great flexibility of the control of the rotating speed of the supercharger or other accessory relative to the engine speed as will be readily apparent, as, where controllable pitch propellers are employed, the pitch of one propeller may be controlled from the engine speed while the control of the pitch of the other propeller may be utilized for adjustment of the relation between the rotating speed of the accessory and that of the engine.

As heretofore indicated, the propeller reduction mechanism with which the auxiliary shaft is connected in accordance with the invention is of the type wherein there is no fixed ratio between the rotating speed of the engine shaft and that of either propeller. Where such mechanism includes two gear assemblies, then because of the torque applied to the auxiliary shaft or shafts in the new arrangements, such gear assemblies are preferably asymmetrical on order to equalize the respective torques applied to the propeller shafts for certain conditions and values of the power taken by the auxiliary shaft.

It is also possible, by the mechanisms hereinafter described, that power may be delivered to the propeller system from the auxiliary shaft so as to supplement the power delivered by the engine. In this case, of course, the supercharger or other accessory would be driven by the exhaust turbine or other source of energy and the auxiliary shaft would be driven by the excess of energy available from such source over that required for the accessory.

The connection of the auxiliary shaft or shafts to the propeller reduction gear system of the propellers may be effected in various ways, depending upon the particular relations desired. For example, the connection may be such that the rotating speed of the auxiliary shaft will bear a fixed ratio to the rotating speed of one propeller shaft, or to the difference of the absolute speeds of the two propellers, or the rotating speed of the auxiliary shaft may be made equal to the difference between, or to the sum of, values each proportional to the speed of a different one of the two propellers or equal to the difference between, or to the sum of, values proportional respectively to the speed of one propeller and to the speed of engine shaft.

These various arrangements and the particular advantages of each will be better understood from the following description and by reference to the accompanying drawings, of which:

Fig. 1 is a side view partly in section of an airplane engine and supercharger therefor driven by an auxiliary shaft; the shaft being connected to the propeller gear reduction system in accordance with any one of the arrangements of Figs. 2 to 5.

Fig. 2 is a longitudinal sectional view through mechanism representing one embodiment of the invention wherein the auxiliary shaft is driven at a rotating speed equal to the difference between two values respectively proportional to the speeds of the two propellers and suitable for use in the case of an engine of medium power.

Fig. 3 is a view similar to Fig. 2 but illustrating another embodiment of the invention wherein the auxiliary shaft is driven at a rotating speed equal to the difference between two values respectively proportional to the speed of one propeller and to the speed of the engine shaft and suitable for use in the case of a high powered engine.

Figure 4:
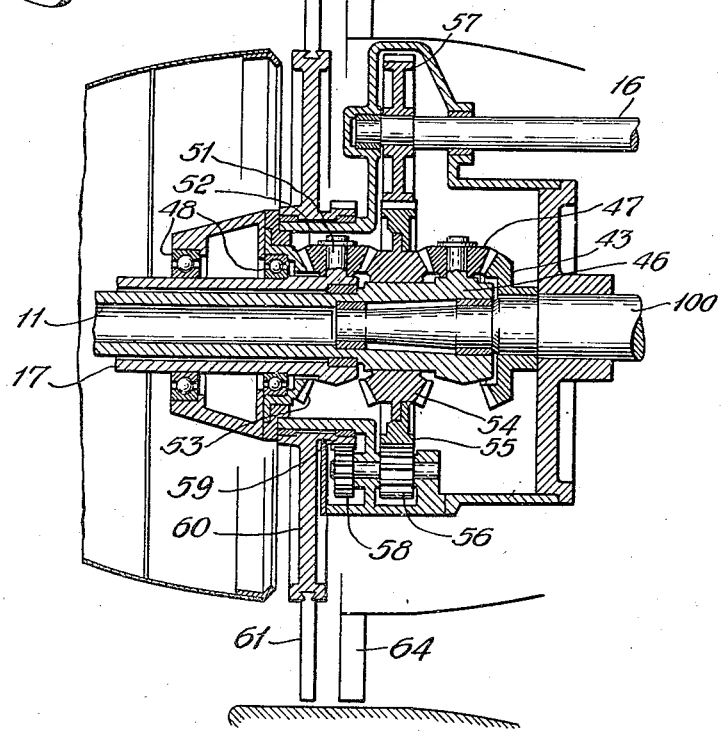
Figure 5:
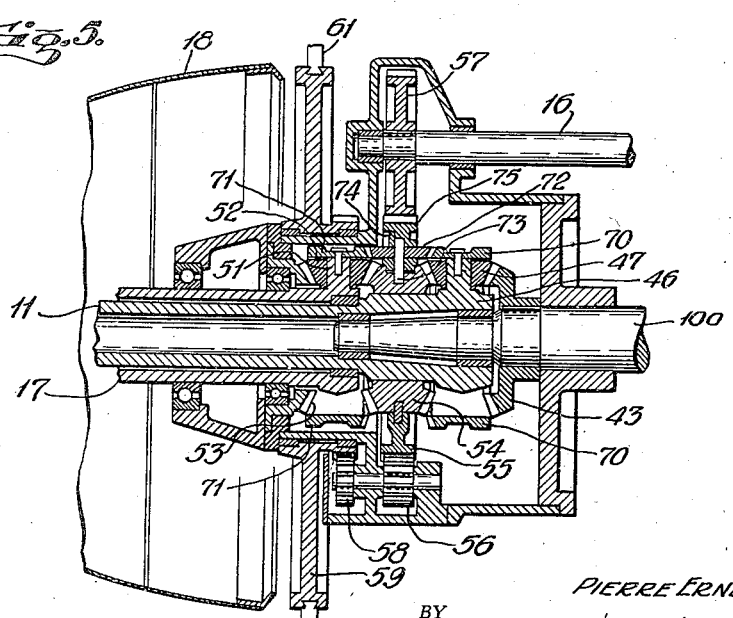

Fig. 4 is a longitudinal sectional view of mechanism representing another embodiment of the invention wherein two auxiliaries are so driven from the propeller reduction gearing as to have their rotating speeds proportional to the rotating speed of one of the two propellers; and Fig. 5 is a view similar to that of Fig. 4 wherein the rotating speeds of the auxiliaries are proportional to the arithmetical difference of the speeds of the two propellers.

In Fig. 1 two adjustable pitch counterrotating propellers 101 and 102 are shown as mounted respectively on internal shaft 11 and external shaft 17, both shafts being driven by a radial engine 103. A supercharger 105, here shown as of the centrifugal type, receives air through the inlet pipe 106 and delivers it to the engine inlet manifold through the diffusers 107, scroll 108 and conduit 109. The shaft 110 of the supercharger carries a pinion 111 geared to satellites 112 carried on axles 113 and meshing with an internal fixed gear 114. The axles 113 are secured to a carrier 113a integral with a crown toothed gear 115 rotatably mounted on the shaft 110 and driven from a bevel gear 116 on a shaft 117. Shaft 117, by means of conical gears 118 and 119, is driven by the auxiliary shaft 16. In accordance with the invention, auxiliary shaft 16 is connected to the propeller reduction gear mechanism within the crank case 18 in such manner that the rotating speed of the shaft is a function of the rotating speed of the propellers. Connections of the shaft 16 with the propeller reduction gear system in accordance with the invention are illustrated in Figs. 2 to 5 to which reference may now be had. It will be understood that the auxiliary shaft 16 of Fig. 1 may be driven by any one of the mechanisms of Figs. 2 to 5 or the equivalents thereof.

In the embodiment of the invention illustrated in Fig. 2 the engine shaft 100 has a crown 1 secured thereto with an internal gear 2 geared with satellites 3. The satellites 3 turn on axles 4 carried by a member 5 which also carries axles 6 of satellites 7 geared to an internal gear 8 integral with the crown 1. The satellites 3 are, on the other hand, geared with a central gear 9 carried on a wheel 10 secured to the shaft 11 of one propeller. Satellites 7, on the other hand, are geared with a central pinion 12 which rotates with a wheel 13 carrying an external gear 14 which drives a pinion 15 on the auxiliary shaft 16. Member 5 is fixed to the shaft 17 of the other propeller. A part of the crank case 18 provides a bearing for the end of the auxiliary shaft 16.

In Fig. 2 the rotating speed of auxiliary shaft 16 is equal to the difference between values proportional respectively to the rotating speeds of the propeller shafts 11 and 17, as can be readily demonstrated.

Let $W_E$ be the rotating speed of the engine shaft 100 and therefore of the internal gears 2 and 8 as well, $W_i$ the rotating speed of the inner propeller shaft 11, and therefore of gear 9, and $W_o$ the rotating speed of the outer propeller shaft 17 and therefore of member 5 carried thereby. We can then write for the gears 2 and 9 and the satellites 4

$$\frac{W_E - W_i}{W_o - W_i} = 1 + \frac{f}{b} = K \qquad (1)$$

wherein $f/b$ is the ratio of the number of teeth of gears 9 and 2 and $K$ is a constant.

Similarly for gears 8 and 12 and satellites 7 we have $$\frac{W_E - W_A}{W_o - W_A} = 1 + \frac{f'}{b'} = K' \qquad (2)$$

Where $W_A$ is the rotating speed of gear 12 (proportional to the rotating speed of the auxiliary shaft 16), $f'/b'$ is the ratio of the number of teeth of gears 12 and 8 and $K'$ a constant.

From Equations 1 and 2 we have $$W_E - W_i = K(W_o - W_i) \qquad (3)$$

$$W_E - W_A = K'(W_o - W_A) \qquad (4)$$

and by subtraction $$W_A - W_i = (K - K')W_o + K'W_A - KW_i$$

from which we obtain $$W_A = \frac{1}{K'-1}[(K-1)W_i - (K-K')W_o] \qquad (5)$$

In Equation 5 and in the derivation thereof the symbols $W_E$, $W_i$, $W_o$ and $W_A$ for the rotating speeds are algebraic values. If the direction of rotation of the engine shaft, that is of gear 2, be taken as positive, then that of the outer propeller shaft 17 will likewise be positive while the direction of rotation of the inner propeller shaft 11 will be negative. On the assumption that the direction of rotation of the auxiliary shaft is the same as that of the inner propeller shaft, and by substitution of the numerical values $w_A$, $w_i$ and $w_o$, for the respective algebraic values $W_A$, $W_i$ and $W_o$ with corresponding change of sign of the coefficient of the rotating speed of the outer propeller shaft, Equation 5 becomes $$w_A = \frac{1}{K'-1}[(K-1)w_i - (K'-K)w_o] \qquad (5a)$$

In Equation 5a both $K$ and $K'$ are always greater than unity. Hence the coefficient of $w_i$ is positive. Whether the coefficient of $w_o$ is positive or negative depends upon the relative magnitude of $K$ and $K'$. If $K'$ is greater than $K$, that is, if the ratio of the number of teeth of gear 8 to gear 12 is greater than the ratio of the teeth of gear 2 to gear 9, then $w_A$, proportional to the rotating speed of the auxiliary shaft 16, is equal to the difference between two values, respectively proportional to the rotating speeds of the two propeller shafts 11 and 17, irrespective of what may be the rotating speed of the engine shaft 100. If the first term of Equation 5a is greater than the second term, the auxiliary shaft is rotating in the same direction as the inner propeller shaft, whereas if the second term exceeds the first term, then the auxiliary shaft rotates in the same direction as the outer propeller shaft. If $K'$ is less than $K$, then $w_A$ is equal to the sum of two values respectively proportional to the rotating speeds of the two propeller shafts. The auxiliary shaft 16 may drive the engine supercharger as shown in Fig. 1, and, if desired, it may drive in parallel therewith a blower for supplying cooling air to the engine. Since the multiplication gear system for the supercharger may be arbitrarily selected, it is obvious that by adjusting the respective pitches of the two propellers the mechanism of Fig. 2 makes it possible to drive the supercharger at any desirable speed for any given rotating speed of the engine within, of course, reasonable limits imposed by the propellers' characteristics, the flight conditions and respective requirement of power.

In the mechanism of Fig. 2, unless a sufficiently great amount of power (according to the multiplication gear driven by the auxiliary shaft) is taken by the said shaft, the torque applied to the external propeller shaft 17 is greater than that applied to the internal shaft 11. The arrangement of Fig. 2 is particularly suitable for use with an aircraft engine of medium power.

In the embodiment of the invention illustrated in Fig. 3 the engine shaft 100 carries a wheel 22 which bears an external gear 23 meshing with satellites 25. A member 24 carrying the axles for the satellites 25 rotates with the internal propeller shaft 11 centered in the engine shaft 100 by the bearing 27. An internal gear 28 meshing with the satellites 25, is attached to a member 29 which rotates with the outer propeller shaft 17. A member 30, integral with member 29, carries an internal gear 31. Gear 31 drives satellites 32, whose axles are attached to an annular member 33 which drives a wheel 34 bearing a gear 35. Satellites 32 mesh with a central gear 36 carried by the engine shaft 100. Gear 35 drives the pinion 15 on the auxiliary shaft 16. As in Figs. 1 and 2, a part of the crankcase 18 encloses the gear mechanism and carries bearings for the propeller shaft 17 and the auxiliary shaft 16.

With the mechanism of Fig. 3, the rotating speed of the auxiliary shaft 16 will be equal to the difference between, or to the sum of, values proportional respectively to the rotating speeds of the inner propeller shaft 11 and the engine shaft 100 as can be readily demonstrated.

As before, if $W_E$ is the rotating speed of the engine shaft 100, and therefore of gears 23 and 36, $W_O$ the rotating speed of the outer propeller shaft 17, and therefore of gears 28 and 31, and $W_i$ the rotating speed of the inner propeller shaft 11 and therefore of member 24 carrying the satellites 25, then for gears 23 and 28 and satellites 25, we have $$\frac{W_O - W_E}{W_i - W_E} = K \qquad (7)$$

and for gears 36 and 31 and satellites 32

$$\frac{W_O - W_E}{W_A - W_E} = K' \qquad (8)$$

where $W_A$ is the rotating speed of wheel 34 and therefore proportional to the rotating speed of the auxiliary shaft 16. From Equations 7 and 8 we have $$K(W_i - W_E) - K'(W_A - W_E) = 0$$

or $$W_A = \frac{K W_i}{K'} - \frac{(K - K')}{K'} W_E \qquad (9)$$

Taking, as before, the direction of rotation of the engine shaft, that is, of gear 23 as positive, then the direction of rotation of the inner propeller shaft 11 is positive and of the outer propeller shaft 17 is negative. Assuming the direction of the auxiliary shaft the same as the engine shaft, then the algebraic Equation 9 becomes $$w_A = \frac{K w_i}{K'} - \frac{(K - K')}{K'} w_E \qquad (9a)$$

As in the embodiment of the invention illustrated in Fig. 1 the auxiliary shaft 16 may drive the supercharger and may also drive another aircraft accessory in parallel. The speed of the auxiliary shaft may be adjusted by varying the pitch of the propeller carried by the inner propeller shaft 11. In the arrangement of Fig. 3, unless the auxiliary shaft absorbs a sufficiently great amount of the power delivered by the engine according to the multiplication gear system driven by said shaft, the torque applied to the internal shaft 11 will exceed that applied to the outer shaft 17. For a high powered aircraft engine the mechanism of Fig. 3 is preferred to that of Fig. 2.

In the embodiment of the invention illustrated in Fig. 4 the rotating speed of the auxiliary shaft 16 is maintained proportional to the rotating speed of the external propeller shaft. In Fig. 4 the engine shaft 100 carries a conical toothed crown gear 43. The internal propeller shaft 11 is centered by bearing in the engine shaft 100 and carries a satellite carrier 46, one satellite 47 of which is shown. The external propeller shaft 17, which is supported by ball bearings 48 mounted inside the nose of the crankcase has attached thereto a satellite carrier 51, a satellite 52 of which gears with a fixed tooth and crown gear 53. Satellites 47 and 52 are geared with a double gear 54 freely mounted on the internal propeller shaft 11. This double gear 54 carries a cylindrical gear 55 which meshes with a pinion 56 and with a gear 57. Pinion 56, through a shaft and a pinion 58, drives a gear 59 and wheel 60. Wheel 60 carries the vanes 61 positioned in the passage for the intake of cooling air for the engine. Gear 57 is fixed on the auxiliary shaft 16. Thus the gear 54 drives the blower, comprising the vanes 61 and the shaft 16 in parallel. Shaft 16 as shown in Fig. 1 drives the supercharger for the engine.

That the rotating speed of the auxiliary shaft 16 will be maintained proportional to the rotating speed of the external propeller shaft 17 in the mechanism of Fig. 4 will be apparent when the case of zero rotating speed of shaft 17 is considered. If such speed is zero, satellites 52 will be stationary, as will double gear 54 and consequently gear 17 as well.

In Fig. 4 the control of the rotating speed of the auxiliary shaft 16 is obtained for any given speed of the engine shaft, through adjustment of the pitch of the propeller on shaft 17. Also, the available torque may be adjusted between the blower and supercharger by adjustment of the fixed vanes 64 of the air intake or by other known means for controlling the flow of cooling air.

As the mechanism of Fig. 5 is similar in many respects, particularly in the means for driving the two propeller shafts 11 and 17, to that of Fig. 4, the following description will be confined to the points of difference. In Fig. 5 the satellite carrier 46 has rigidly secured thereto a crown gear 70 and the satellite carrier 51 similarly has secured thereto a crown gear 71. These crown gears 70 and 71 mesh with a pinion 72 freely rotatable on a pin 73 which rides in a circumferential groove in the double gear 54. The pin 73 carries an annular member 74 provided with an external gear 75 which meshes with the gear 57 on the auxiliary shaft 16 and with the pinion 56 driving the fan through pinion 58 and gear 59. Thus the rotating speed of the auxiliary shaft is maintained proportional to the difference in the absolute values of the rotating speeds of the propeller shafts.

The arrangement of 5 allows a wide variation in the working conditions of the supercharger or other accessory driven by the shaft 16 since with proper multiplication gearing a small difference between the rotating speeds of the propeller shafts may induce a great variation in the corresponding rotating speed of the auxiliary shaft. As in the other embodiments of the invention, the control of the rotating speed of the auxiliary shaft driving the supercharger is obtained, for any given speed of the engine, through the proper adjustment of the pitch of the propellers.

Thus the mechanisms of Figs. 4 and 5 might be considered theoretically as special cases of the mechanism of Fig. 2. That is, Fig. 4 corresponds to the case when the coefficient of $W_i$ of Equation 5 equals zero, and Fig. 5 corresponds to the case when the coefficients of $W_i$ and $W_O$ of Equation 5 are equal. In such special cases the rotating speed of the auxiliary shaft can be independent of the engine speed. Actually these special cases could not be achieved with the exact mechanism of Fig. 2.

The invention has now been described in connection with several embodiments thereof, in each of which an auxiliary shaft is connected with the propeller reduction gearing so as to be driven thereby and so as to have its rotating speed varied by adjustment of the pitch of one or of both propellers. In each embodiment of the invention the rotating speed of the auxiliary shaft is a predetermined function of the rotating speeds of the two propellers. As heretofore indicated, mechanisms constructed according to the invention are primarily intended for obtaining any desired relation between the rotating speed of the supercharger and of the engine, but such application of the invention, although at the present time probably of the most immediate utility, is not the only application to which the invention may be put. As exhaust turbines adapted to withstand higher and higher temperatures are developed, more and more power will become available therefrom and such power can be used to drive the supercharger and the excess thereof over that required for this purpose could be applied to an auxiliary shaft such as shaft 16. Shaft 16 would then deliver power to the propellers, thus supplementing that delivered by the engine.

It will be understood that the invention in its broadest scope is not limited to the specific mechanisms illustrated in the drawings except as defined in the appended claims.

I claim:

1. The combination according to claim 7 wherein said reduction mechanism comprises a crown secured to the engine shaft and carrying an internal gear, an external gear secured to one propeller shaft, a satellite carrying member secured to the other propeller shaft, satellites carried thereby and engaging said external and internal gears, a second internal gear carried by said crown, an external gear rotatably mounted on a propeller shaft, additional satellites carried by said member and engaging said last mentioned internal and external gears, and wherein said element comprises a gear wheel secured to said last mentioned external gear.

2. The combination according to claim 7 wherein said reduction mechanism comprises a central gear secured to said engine shaft, an internal gear carried by one propeller shaft, satellites geared to said central and internal gears, a carrier for said satellites secured to the other propeller shaft, a second central gear carried by said engine shaft, a second internal gear carried by said first mentioned propeller shaft, and satellites geared to said last mentioned central and internal gears, and wherein said element comprises a carrier for said last mentioned satellites.

3. In an airplane the combination comprising an engine having a shaft, a pair of coaxial shafts and counter-rotating propellers mounted thereon, an auxiliary shaft and mechanism for the transmission of motion from said engine shafts to said coaxial shafts and to said auxiliary shaft, said mechanism comprising a satellite carrier secured to each propeller shaft, satellites carried thereby, a double crown gear rotatably mounted on one of the propeller shafts and provided with a circumferential groove, the satellites on said carriers engaging said double gear therebetween, a crown gear on the engine shaft engaging the satellite on one carrier and a fixed gear engaging the satellite on the other carrier, an annular external gear encircling said double gear, a pin carried by said annular gear, slidable in said groove, a pinion rotatably mounted on said pin, annular crown gears fixed to said carriers and engaging said pinion therebetween, and a gear on said auxiliary shaft engaging said external gear.

4. The combination according to claim 3 including a supercharger for the engine driven by said auxiliary shaft, a blower for delivering cooling air to the engine and means for driving said blower from said external gear.

5. In an airplane, a pair of controllable pitch counter rotating propellers mounted on coaxial shafts, an engine having a shaft, reduction mechanism for driving the propeller shafts from said engine shaft, said mechanism including an element rotating at a speed which is a predetermined function of the rotating speeds of the propellers, a supercharger, an auxiliary shaft for driving said supercharger, and driving connections between said auxiliary shaft and said element whereby the rotating speed of said supercharger may be varied independently of the rotating speed of the engine shaft by adjustment of the pitch of the propellers.

6. The combination according to claim 5 including a blower for delivering cooling air to the engine and means for driving said blower in parallel with said auxiliary shaft to divide the available torque therebetween.

7. The combination with an airplane engine having a shaft, of a pair of coaxial shafts, controllable pitch propellers mounted on said coaxial shafts, a reduction mechanism intermediate said engine shaft and said coaxial shafts for driving the propellers in opposite directions from the engine shaft, an element in said mechanism rotating at a speed the ratio of which to the rotating speed of the engine shaft varies with the adjustment of the pitch of one of the propellers, an auxiliary shaft geared to said element so as to be driven thereby and a supercharger driven by said auxiliary shaft.

8. The combination with an airplane engine having a shaft, of a pair of coaxial shafts, controllable pitch propellers mounted on said coaxial shafts, a reduction mechanism intermediate said engine shaft and coaxial shafts for driving the propellers in opposite directions from the engine shaft, an element in said mechanism rotating at a speed which for any fixed speed of the engine shaft varies directly with variations in the difference between the absolute rotating speeds of the two propellers, an auxiliary shaft coupled to said element so as to be driven thereby and a supercharger driven by said auxiliary shaft, whereby the rotating speed of the supercharger relative to that of the engine may be varied by adjustment of the pitch of a propeller.

9. The combination according to claim 3 wherein said propellers are of the controllable pitch type and including a supercharger driven by said auxiliary shaft, whereby the rotating speed of the supercharger relative to that of the engine shaft may be varied by adjustment of the pitch of a propeller.

10. The combination according to claim 7 including a blower driven in parallel with said supercharger by said auxiliary shaft whereby the rotating speeds of the supercharger and blower relative to that of the engine may be varied by adjustment of the pitch of a propeller.

PIERRE ERNEST MERCIER.